(12) United States Patent
Sin et al.

(10) Patent No.: US 12,179,664 B2
(45) Date of Patent: Dec. 31, 2024

(54) APPARATUS FOR ALERTING FIRE OF A VEHICLE AND METHOD THEREOF

(71) Applicants: Hyundai Motor Company, Seoul (KR); Kia Corporation, Seoul (KR)

(72) Inventors: Geun Ok Sin, Janggye-Myeon (KR); Won Jun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 73 days.

(21) Appl. No.: 17/880,228

(22) Filed: Aug. 3, 2022

(65) Prior Publication Data

US 2023/0173980 A1 Jun. 8, 2023

(30) Foreign Application Priority Data

Dec. 7, 2021 (KR) .................. 10-2021-0174124

(51) Int. Cl.
*B60Q 9/00* (2006.01)
*G01K 13/00* (2021.01)
*B60R 16/023* (2006.01)

(52) U.S. Cl.
CPC .............. *B60Q 9/00* (2013.01); *G01K 13/00* (2013.01); *B60R 16/0239* (2013.01)

(58) Field of Classification Search
CPC .......... B60Q 9/00; G01K 13/00; G01K 3/005; B60R 16/0239; B60R 16/02; B60R 16/0232; G08B 17/06; G08B 7/06; G08B 25/00; G08B 21/182; B60Y 2400/302
See application file for complete search history.

(56) References Cited

U.S. PATENT DOCUMENTS

| | | | | |
|---|---|---|---|---|
| 5,479,350 A | * | 12/1995 | Barakchi | .................. G07C 3/00 |
| | | | | 374/170 |
| 8,776,905 B2 | | 7/2014 | Lim et al. | |
| 2010/0320021 A1 | * | 12/2010 | Rini | ...................... B60L 3/0007 |
| | | | | 180/271 |
| 2013/0075116 A1 | | 3/2013 | Lim et al. | |
| 2016/0339786 A1 | * | 11/2016 | Dickinson | ............... B60L 53/16 |
| 2020/0086152 A1 | * | 3/2020 | Stadler | .................. H01M 50/30 |
| 2021/0344145 A1 | * | 11/2021 | O'Rourke | ............ H01R 13/713 |
| 2021/0354564 A1 | * | 11/2021 | Lee | ...................... H01M 50/249 |
| 2022/0126698 A1 | * | 4/2022 | Roh | .......................... A62C 3/07 |
| 2022/0407176 A1 | * | 12/2022 | Ryder | ..................... A62C 37/40 |

FOREIGN PATENT DOCUMENTS

| | | | | |
|---|---|---|---|---|
| DE | 102021212992 A1 | * | 5/2023 | ............. H02K 11/25 |
| KR | 10-1294169 B | | 8/2013 | |
| WO | WO-2021059767 A1 | * | 4/2021 | ......... B60R 16/0239 |

* cited by examiner

*Primary Examiner* — An T Nguyen
(74) *Attorney, Agent, or Firm* — Morgan, Lewis & Bockius LLP (57) ABSTRACT

A fire alerting apparatus for a vehicle, includes: a temperature sensing device configured to detect a temperature of a bus bar of a high-voltage junction box; and performing a warning by determining at least one of a fire warning state, an overtemperature state, or a vehicle inspection state in accordance with a temperature detection result of the temperature sensing device.

18 Claims, 6 Drawing Sheets

APPARATUS FOR ALERTING FIRE OF A VEHICLE AND METHOD THEREOF

CROSS-REFERENCE TO RELATED APPLICATION

The present application claims priority to Korean Patent Application No. 10-2021-0174124, filed on Dec. 7, 2021, the entire contents of which is incorporated herein for all purposes by this reference.

BACKGROUND OF THE PRESENT DISCLOSURE

Field of the Present Disclosure

The present disclosure relates to a fire alerting apparatus for a vehicle and a method thereof, and more particularly, to a technique for warning a fire in a commercial eco-friendly vehicle.

Description of Related Art

Recently, as introduction of eco-friendly vehicles has accelerated, a number of related vehicle fires is also increasing.

An eco-friendly vehicle (xEV) replaces an engine of a conventional internal combustion locomotive, and includes a motor and a high-voltage battery, and has a complex powernet configuration that includes a high-voltage battery, a high-voltage junction box, and electrified PE parts.

Among them, a key component is the high-voltage battery, and because a state change of the high-voltage battery has a great effect on vehicle operation, it is monitored and recorded through various methods. Because state changes such as overvoltage, overcurrent, and high temperature are fatal to the battery, it is controlled and diagnosed in an optimal state through a battery management system (BMS) controller, and many methods and technologies are being developed for it.

In addition to the high-voltage battery, the high-voltage junction box, which is a component for optimal power distribution among high-voltage electronic components, is connected to the high-voltage battery through a high-voltage cable and a high-voltage connector, and is responsible for power distribution to each electronic device.

In the case of a commercial eco-friendly vehicle, because the vehicle itself is large and the driving conditions are harsh, more electrified power parts are applied compared to an eco-friendly vehicle for passenger use, and thus a complex power topology is formed. That is, the commercial environment-friendly vehicles is provided with many battery packs, and two or more high voltage junction boxes are applied, and as a result, a configuration of high-voltage cables and high-voltage connectors becomes complicated, making it difficult to set up vehicle layouts and configure powernets.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fire alerting apparatus configured for a vehicle and a method thereof, configured for detecting a fire situation of a commercial eco-friendly vehicle in advance and warning it step by step by including a temperature sensor for fire warning in a high-voltage junction box directly connected to a high-voltage battery.

The technical objects of the present disclosure are not limited to the objects mentioned above, and other technical objects not mentioned may be clearly understood by those skilled in the art from the description of the claims.

Various aspects of the present disclosure are directed to providing a fire alerting apparatus for a vehicle, including: a temperature sensing device configured to sense a temperature of a bus bar of a high-voltage junction box; and performing a warning by determining at least one of a fire warning state, an overtemperature state, or a vehicle inspection state in accordance with a temperature detection result of the temperature sensing device.

In an exemplary embodiment of the present disclosure, it may further include an interface device controlled by the controller to notify the at least one of the fire warning state, the overtemperature state, or the vehicle inspection state.

In an exemplary embodiment of the present disclosure, the controller may be configured to determine whether the temperature of the bus bar is greater than a first reference value, and may conclude that driving of the vehicle is in a normal state when the temperature of the bus bar is equal to or smaller than the first reference value.

In an exemplary embodiment of the present disclosure, the controller, when the temperature of the bus bar is greater than the first reference value, may determine whether the temperature of the bus bar is greater than a second reference value which is greater than the first reference value.

In an exemplary embodiment of the present disclosure, the controller, when the temperature of the bus bar is greater than the second reference value, may determine that the vehicle is in a fire risk situation to output the warning including a fire warning notification through the interface device.

In an exemplary embodiment of the present disclosure, the controller may start counting the overtemperature state when the temperature of the bus bar is equal to or smaller than the second reference value and greater than the first reference value.

In an exemplary embodiment of the present disclosure, the controller, when an overtemperature state counting value is greater than or equal to a predetermined threshold value, may determine that the vehicle state is the overtemperature state, and may output an overtemperature state notification through the interface device.

In an exemplary embodiment of the present disclosure, the controller, when an overtemperature state counting value is smaller than a predetermined threshold value, may determine that vehicle inspection is required, and may output a vehicle inspection notification through the interface device.

In an exemplary embodiment of the present disclosure, the controller, when the temperature of the bus bar is greater than the second reference value and a vehicle state is in an abnormal load state in which overcurrent or overvoltage occurs, may determine that the vehicle is in a fire risk situation to output the warning including a fire warning notification through the interface device.

In an exemplary embodiment of the present disclosure, the interface device may differentiate a color of a warning light when the fire warning state is notified and the overtemperature state is notified, and may display an overtemperature state repetition number together.

In an exemplary embodiment of the present disclosure, it may further include when the fire warning state is notified, a communication device controlled by the controller to transmit the fire warning state of the vehicle to an external vehicle service center.

In an exemplary embodiment of the present disclosure, the controller may switch a driving mode of the vehicle to an emergency mode when the fire warning state is notified, and may block a load operation in the vehicle.

In an exemplary embodiment of the present disclosure, the temperature sensing device may be provided in a load including a peak current or voltage greater than a predetermined value among connectors configured in the high-voltage junction box.

In an exemplary embodiment of the present disclosure, the temperature sensing device may be provided in a high-temperature portion depending on an internal temperature distribution of the bus bar of the high-voltage junction box.

In an exemplary embodiment of the present disclosure, the temperature sensing device may be provided in a load including a low maximum allowable temperature or a high voltage connector body of the high-voltage junction box.

Various aspects of the present disclosure are directed to providing a fire alerting method for a vehicle, including: detecting a temperature of a bus bar of a high-voltage junction box; and performing a warning by determining at least one of a fire warning state, an overtemperature state, or a vehicle inspection state in accordance with a temperature detection result of the temperature sensing device.

In an exemplary embodiment of the present disclosure, the performing of the warning may include: determining whether the temperature of the bus bar is greater than a first reference value; and concluding that driving of the vehicle is in a normal state when the temperature of the bus bar is equal to or smaller than the first reference value.

In an exemplary embodiment of the present disclosure, the performing of the warning may further include: when the temperature of the bus bar is greater than the first reference value, determining whether the temperature of the bus bar is greater than a second reference value which is greater than the first reference value; and concluding that the vehicle is in a fire risk situation to output a fire warning notification when the temperature of the bus bar is greater than the second reference value.

In an exemplary embodiment of the present disclosure, the performing of the warning may include starting counting the overtemperature state when the temperature of the bus bar is equal to or smaller than the second reference value and greater than the first reference value.

In an exemplary embodiment of the present disclosure, it may further include determining that a vehicle state is an overtemperature state, and outputting an overtemperature state notification when an overtemperature state counting value is greater than or equal to a predetermined threshold value; and concluding that vehicle inspection is required, and outputting a vehicle inspection notification when the overtemperature state counting value is smaller than the predetermined threshold value.

According to the present technique, it is possible to detect a fire situation of a commercial eco-friendly vehicle in advance and warn it step by step by including a temperature sensor for fire warning in a high-voltage junction box directly connected to a high-voltage battery, reducing damage to people, facilities, and vehicles caused by fire and reducing quality-related costs.

Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to various exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field of the present disclosure to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 6.

Figure 1:
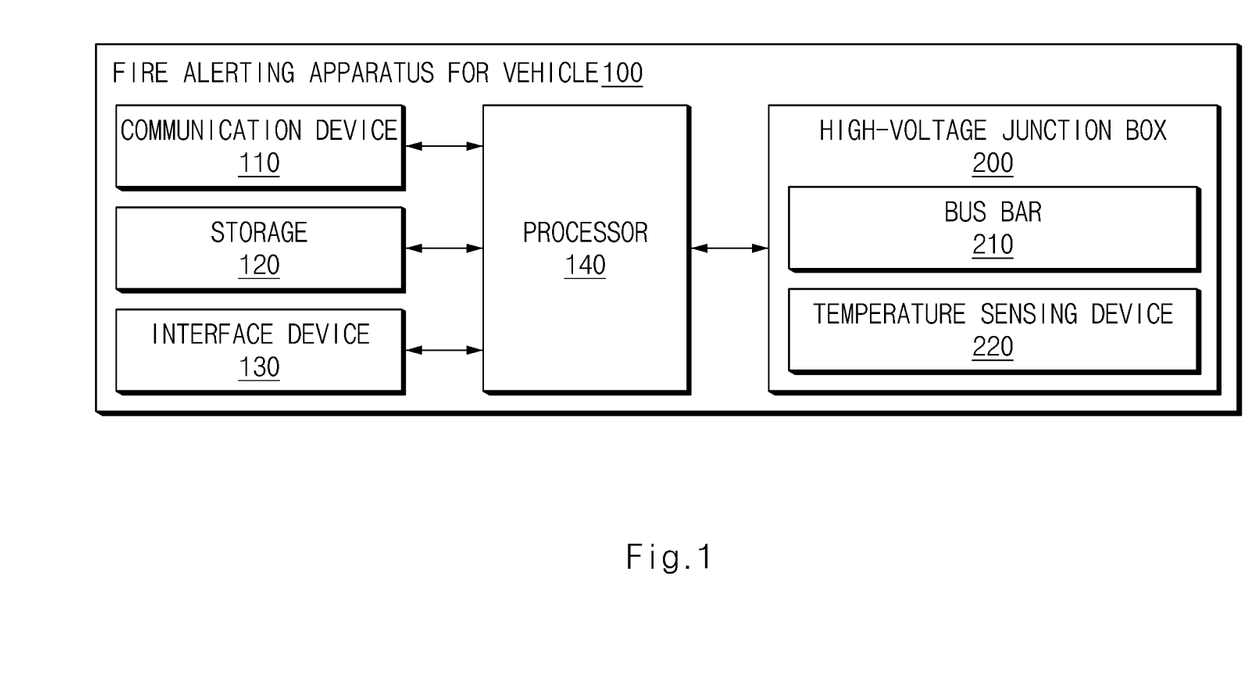
FIG. 1 illustrates a block diagram showing a configuration of a fire warning apparatus for a vehicle according to various exemplary embodiments of the present disclosure.
Figure 2:
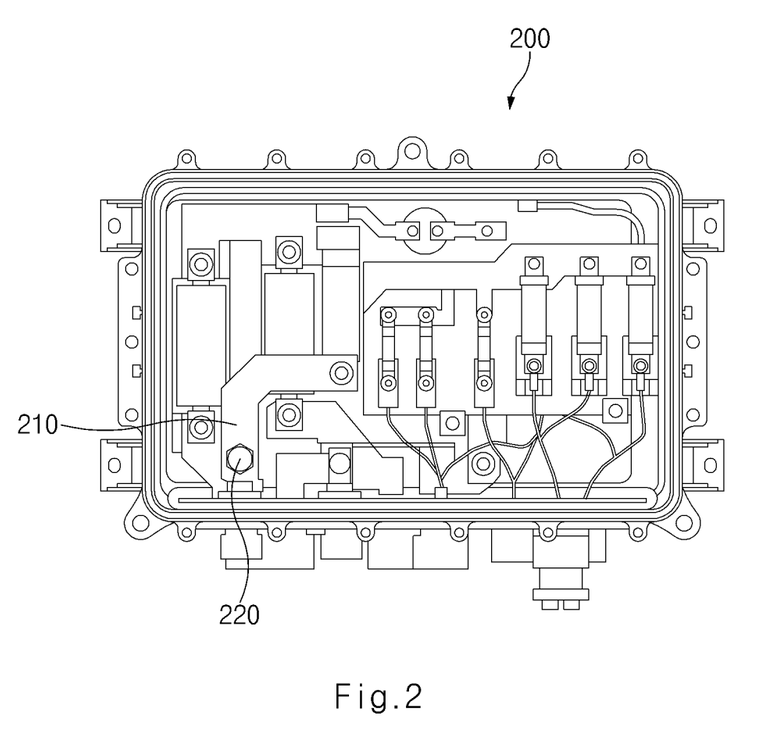
FIG. 2 illustrates a detailed schematic diagram of a high-voltage junction box according to various exemplary embodiments of the present disclosure.
Figure 3:
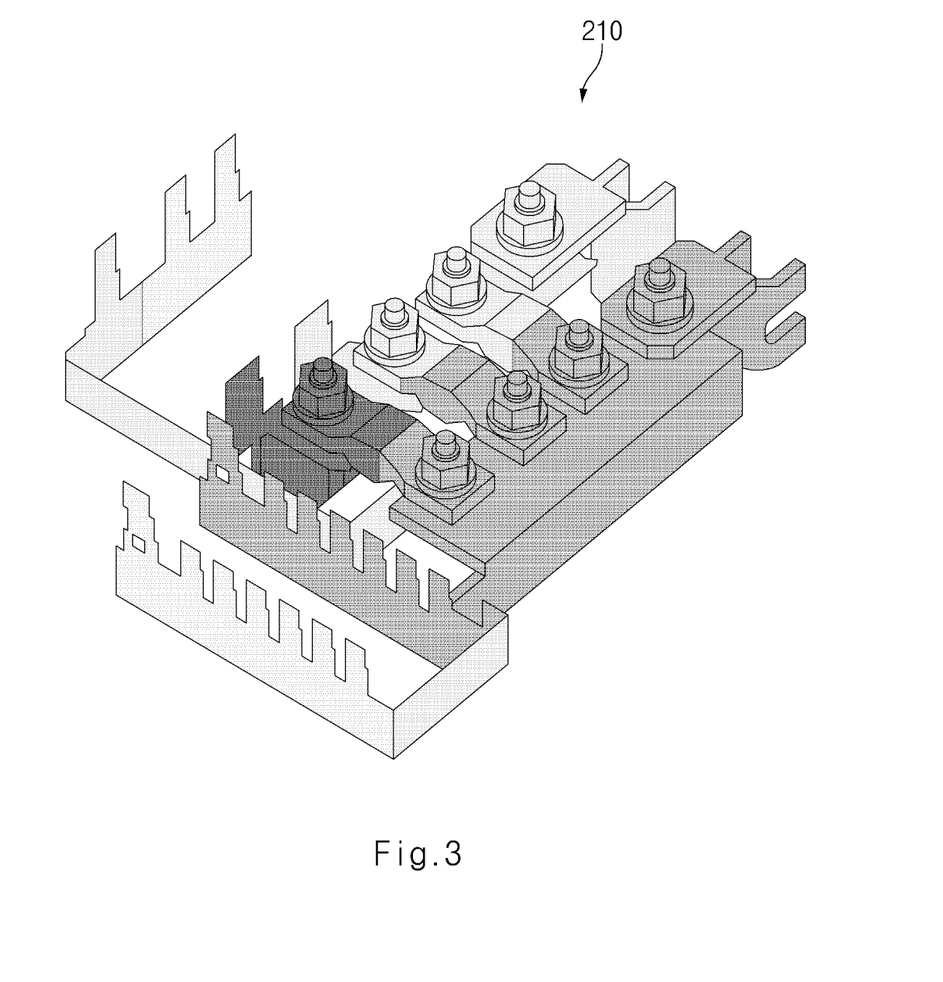
FIG. 3 illustrates a temperature distribution for each load in a bus bar according to various exemplary embodiments of the present disclosure.

FIG. 1 illustrates a block diagram showing a configuration of a fire warning apparatus for a vehicle according to various exemplary embodiments of the present disclosure, and FIG. 2 illustrates a detailed schematic diagram of a high-voltage junction box according to various exemplary embodiments of the present disclosure.

As heat is generated due to an inflow of moisture into the high-voltage junction box or an increase in power supply resistance caused by external factors such as terminal crimping, heat is conducted to a connector body, which may cause a fire. Furthermore, cables and wiring may break while showing a melting point depending on an instantaneous power difference in a short circuit due to overcurrent caused by the short circuit of the cables and the wiring by short-circuit fire. In the instant case, an overcurrent situation due to the short-circuit of the cables and the wiring may be controlled through a high-voltage fuse in the high-voltage junction box.

Furthermore, when an electric current is controlled by electrified parts, current and voltage values repeat peak values, which may result in high voltage degradation. That is, heat is generated due to the overcurrent, and degradation may proceed. Such heat is one of causes of degrading fires, and because heat from the bus bar always takes precedence before a fire, in an exemplary embodiment of the present disclosure, a possibility of the fire may be determined by detecting heat from the bus bar.

The fire warning apparatus 100 according to the exemplary embodiment of the present disclosure may be implemented inside the vehicle. In the instant case, the fire warning apparatus 100 may be integrally formed with internal control units of the vehicle, or may be implemented as a separate device to be connected to control units of the vehicle by a separate connection means.

The fire warning apparatus 100 may be connected to a high-voltage junction box 200, and may warn a user in advance of an over-temperature condition and a possible fire situation to respond abnormal conditions such as overvoltage, overcurrent, and short circuit when overtemperature due to the abnormal conditions is detected in the high-voltage junction box 200 by a temperature sensing device 220.

Referring to FIG. 1, the fire warning apparatus 100 according to various exemplary embodiments of the present disclosure includes a communication device 110, a storage 120, an interface device 130, a controller 140, and the high-voltage junction box 200, and the high-voltage junction box 200 may include a bus bar 210 and the temperature sensing device 220.

The communication device 110 is a hardware device implemented with various electronic circuits to transmit and receive signals through a wireless or wired connection, and may transmit and receive information based on in-vehicle devices and in-vehicle network communication techniques. As an exemplary embodiment of the present disclosure, the in-vehicle network communication techniques may include controller area network (CAN) communication, Local Interconnect Network (LIN) communication, flex-ray communication, and the like.

Furthermore, the communication device 110 may perform communication by use of a server, a service center, infrastructure, or third vehicles outside the vehicle, and the like through a wireless Internet access or short range communication technique. Herein, the wireless communication technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like.

The communication device 110 may perform Vehicle-to-Everything (V2X) communication. The V2X communication may include communication between vehicle and all entities such as Vehicle-to-vehicle (V2V) communication which refers to communication between vehicles, Vehicle to Infrastructure (V2I) communication which refers to communication between a vehicle and an eNB or road side unit (RSU), Vehicle-to-pedestrian (V2P) communication, which refers to communication between user equipment (UE) held by vehicles and individuals (pedestrians, cyclists, vehicle users, or occupants), and Vehicle-to-network (V2N) communication.

For example, the communication device 110 may notify a vehicle abnormal situation such as a vehicle fire warning state to the service center. Accordingly, the service center may call a driver of the vehicle for immediate confirmation of the situation, and may establish an emergency communication network to immediately contact with a fire department in the vicinity of the vehicle.

The storage 120 may store sensing results of the temperature sensing device 220 and data and/or algorithms required for the processor 140 to operate, and the like.

As an exemplary embodiment of the present disclosure, the storage device 120 may store a reference value for determining whether a temperature of the bus bar 210 is in an overtemperature state, a fire warning state, or the like. In the instant case, a first reference value T1 for determining whether the vehicle is in a normal state or an abnormal state (overtemperature state, fire warning state, etc.) may be set as a value obtained by adding a certain value (e.g., 90 degrees) to a measured value of an atmospheric temperature sensor. Furthermore, a second reference value T2 for determining whether the vehicle is in the overtemperature state or the fire warning state may be greater than the first reference value, and may be set based on an allowable temperature correction value of a high-voltage connector. Furthermore, an overtemperature state repetition number threshold N1 for determining the overtemperature state repetition number may be stored in advance to determine whether it is a temporary overtemperature state or an overtemperature state requiring vehicle inspection. In the instant case, the overtemperature state repetition number threshold may be set based on a numerical value evaluated under actual vehicle driving conditions.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. Furthermore, the input means may include a soft key implemented on the display.

The interface device 130 may be implemented as a head-up display (HUD), a cluster, an audio video navigation (AVN), or a human machine interface (HM), a human machine interface (HMI).

The output device may include a display, and may also include a voice output means such as a speaker. In the instant case, when a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

Figure 4A:
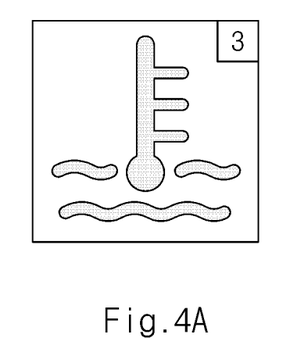
FIG. 4A and FIG. 4B illustrate stepwise examples of a screen of a vehicle fire warning according to various exemplary embodiments of the present disclosure.
Figure 4B:
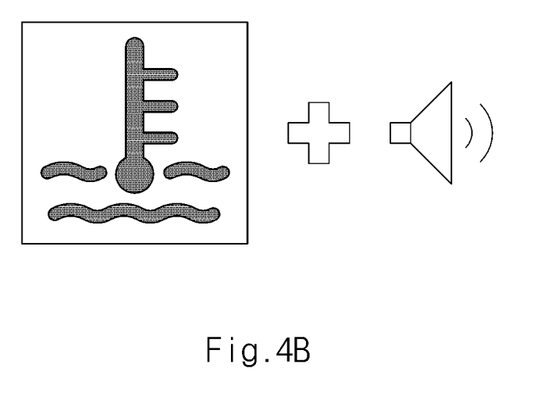

As an exemplary embodiment of the present disclosure, the output means may inform a user by outputting a possible situation of fire. As an exemplary embodiment of the present disclosure, the output means may output an overtemperature state notification, a fire warning notification, a vehicle inspection notification, and the like. When the overtemperature state is notified, the output means may turn on a yellow warning light on an instrument panel as illustrated in FIG. 4A, may count an abnormal situation, and display a counting number together. Furthermore, when the fire warning state is notified, the output means may blink a red warning light on the instrument panel and output a warning sound together as illustrated in FIG. 4B.

Furthermore, in the case where the vehicle inspection is notified, the output means may output a notification inducing a visit to a service center when charging the vehicle, and may display an accumulated number of overtemperature states. To the present end, it is necessary to store the accumulated number of overtemperature states in a memory so that it may be counted even after the vehicle is started.

The controller 140 may be electrically connected to the communication device 110, the storage 120, the interface device 130, the temperature sensing device 220, and the like, may electrically control each component, and may be an electrical circuit that executes software commands, performing various data processing and determinations described below.

The controller 140 may be, e.g., an electronic control unit (ECU), a micro controller unit (MCU), or other subcontrollers mounted in the vehicle.

The controller 140 may perform general control so that each component may normally perform a function thereof. The processor 140 may process signals transferred between constituent elements of the fire alerting apparatus 100. The controller 140 may be implemented in a form of hardware, software, or a combination of hardware and software. For example, the controller 140 may be implemented as a microprocessor, but the present disclosure is not limited thereto. The controller 140 may be, e.g., an electronic control unit (ECU), a micro controller unit (MCU), or other sub controllers mounted in the vehicle.

The controller 140 may perform a warning by determining at least one of the fire warning state, the overtemperature state, or the vehicle inspection state in accordance with a result of detecting the temperature of the bus bar 220.

The controller 140 may determine whether a temperature of the bus bar 210 is greater than a predetermined first reference value, and may determine that driving is in a normal state when the temperature of the bus bar 210 is equal to or smaller than the first reference value.

When the temperature of the bus bar 210 is greater than the first reference value, the controller 140 may determine whether the temperature of the bus bar 210 is greater than a second reference value which is greater than the first reference value.

When the temperature of the bus bar 210 is greater than the second reference value, the controller 140 may determine that the vehicle is in a fire risk situation to output a fire warning notification through the interface device 130.

When the temperature of the bus bar 210 is equal to or smaller than the second reference value, the controller 140 may start counting the overtemperature state.

When an overtemperature state counting value is greater than or equal to a predetermined threshold value, the controller 140 may determine that the vehicle state is an overtemperature state, and may output an overtemperature state notification through the interface device 130.

When the overtemperature state counting value is smaller than the predetermined threshold value, the controller 140 may determine that vehicle inspection is required, and may output a vehicle inspection notification through the interface device 130.

That is, when an overtemperature state occurs, the controller 140 counts an overtemperature state entering situation as a method for determining whether a corresponding situation is temporary or continuous. The controller 140 measures a time period from the moment it exceeds the first reference value T1 to the moment it falls again as a counting condition, and determines a sequence thereof as one time. The controller 140 may measure a general counting number under an actual vehicle driving condition, may set an evaluation value thereof as a reference value, and may determine it based on the accumulated number of times.

When the temperature of the bus bar 210 is greater than the second reference value and an abnormal load state in which overcurrent or overvoltage occurs, the controller 140 may determine that the vehicle is in a fire risk situation to output a fire warning notification through the interface device 130.

The controller 140 may switch the driving mode of the vehicle to the emergency mode when a fire warning is notified, and may block operation of a load (e.g., electrical equipment that uses power) in the vehicle.

Furthermore, the controller 140 may transmit a fire warning notification to the service center through the communication device 110 when the vehicle inspection notified. In the instant case, it is possible to make a reservation at a nearby service center in conjunction with an in-vehicle infotainment system. Furthermore, the controller 140 may transmit a fire warning notification to a fire station around the vehicle through the in-vehicle infotainment system when the fire warning notified.

Accordingly, according to an exemplary embodiment of the present disclosure, it is possible to effectively detect and prevent vehicle fires in an eco-friendly vehicle, particularly a commercial vehicle in which power topology of high voltage series becomes complicated.

The high-voltage junction box 200, which is a component for optimal power distribution among high-voltage electronic components, is connected to the high-voltage battery through a high-voltage cable and a high-voltage connector, and is responsible for power distribution to each electronic device.

The high-voltage junction box 200 is a center of a power topology configuration leading to the high-voltage battery, the high-voltage junction box, and the power electric (PE) components, and is set as a part that detects heat through a point that an input and an output are connected to the high-voltage junction box through the bus bar 210 connected to the high-voltage connector.

The bus bar 210 connects the high-voltage battery and the high-voltage connector.

The temperature sensing device 220, which is a temperature sensor, may detect a temperature of the high-voltage junction box 200 and determine that overtemperature has occurred when the temperature of the high-voltage junction box 200 exceeds a predetermined reference value. That is, the temperature sensing device 220 detects the temperature of the bus bar and transmits temperature information to the controller 140. Accordingly, the controller 140 may determine a possibility of a fire through the temperature information received from the temperature sensing device 220 and an overall power distribution flow.

The temperature sensing device 220 may be provided in a load having a large peak current (voltage) among connectors configured in the high-voltage junction box 200. For example, a load having a large current (voltage) peak may include a high-voltage battery connector (battery plus input terminal), an MCU connector (DC plus input terminal), and the like. Furthermore, the temperature sensing device 220 may be provided in a load having a maximum allowable temperature lower than a predetermined value of a thermal analysis distribution high temperature measuring device or a high voltage connector body (housing) of the high-voltage junction box. Accordingly, a detailed position of the temperature sensing device 220 may be selected.

The temperature sensing device 220 has a low-voltage connection port for configuring an interlock circuit in the high-voltage junction box, and may be configured using it.

The controller 140 sets a determination condition value (ES standard 90 degrees) for a temperature rise of the bus bar of the high-voltage junction box as a first threshold value (THRESHOLD 1, T1), and sets a correction value (*) for a maximum allowable temperature of the high-voltage connector body (housing) as a second threshold of a temperature rise (THRESHOLD 2, T2). In the instant case, because an actual temperature of the bus bar is not the same as the temperature of the connector housing, it is necessary to apply a correction value through a separate evaluation (actual vehicle thermal analysis evaluation, simulation).

Accordingly, the controller 140 notifies a user step by step depending on a measured temperature and its frequency, to determine responding scenario of the user and a system.

Figure 5:
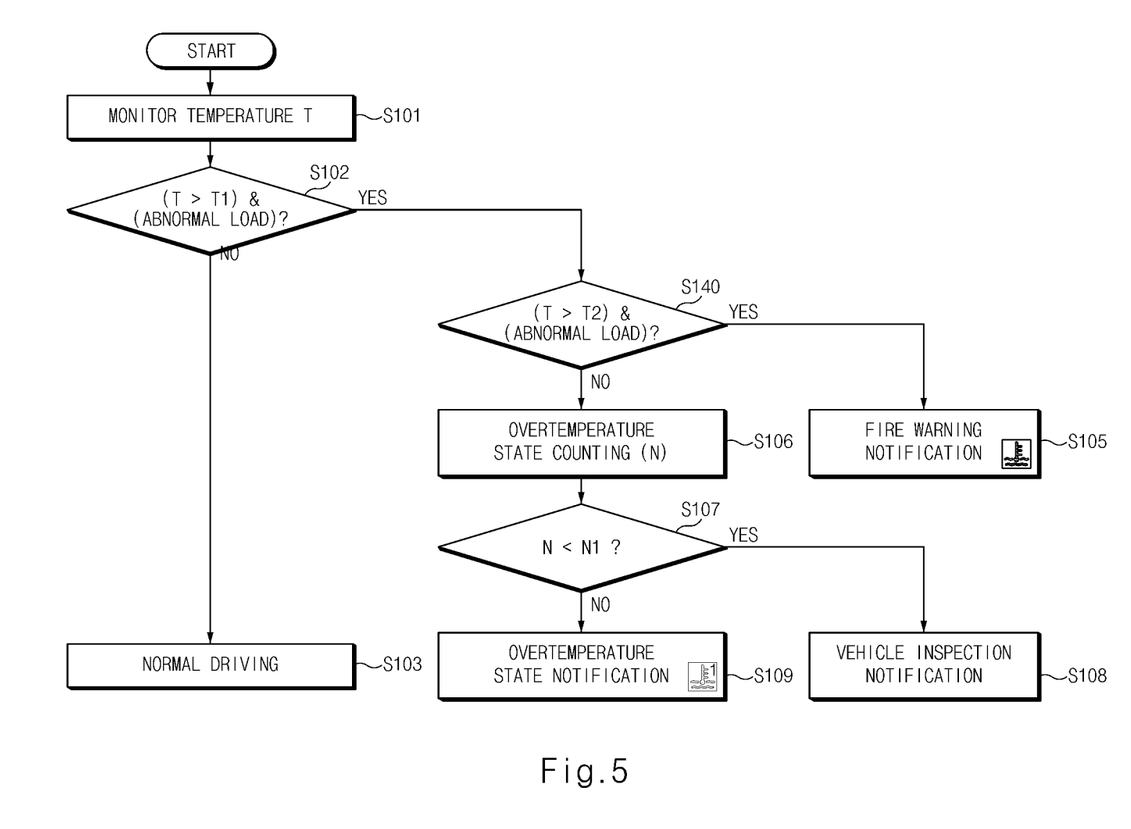
FIG. 5 illustrates a flowchart showing a fire warning method for a vehicle according to various exemplary embodiments of the present disclosure.

Hereinafter, a fire alerting method for a vehicle according to various exemplary embodiments of the present disclosure will be described in detail with reference to FIG. 5. FIG. 5 illustrates a flowchart showing a fire warning method for a vehicle according to various exemplary embodiments of the present disclosure.

Hereinafter, it is assumed that the fire alerting apparatus 100 of the of FIG. 1 performs processes of FIG. 5. Furthermore, in the description of FIG. 5, operations referred to as being performed by a device may be understood as being controlled by the controller 140 of the fire alerting apparatus 100.

Referring to FIG. 5, the temperature sensing device 220 monitors the temperature of the bus bar 210 of the high-voltage junction box 200 (S101).

The controller 140 determines whether the temperature of the bus bar 210 detected by the temperature sensing device 220 is greater than a predetermined first threshold value T1 and it is in an abnormal load state (S102). In the instant case, the first threshold value may be set by adding a determination condition value (e.g., 90 degrees) to a measurement value of an atmospheric temperature sensor. In the instant case, such a specific value may be determined by empirical values. Furthermore, the abnormal load state is a state in which overcurrent or overvoltage of a monitored load is measured, and when a specific load to which the temperature sensing device 220 is mounted is selected, it may be determined whether a load is in an abnormal load state by checking whether the load is out of a normal range.

When the temperature of the bus bar 210 is equal to or smaller than the predetermined first threshold T1 or it is not in the abnormal load state, the controller 140 controls the vehicle to be driven normally (S103).

On the other hand, when the temperature of the bus bar 210 is greater than the predetermined first threshold value T1 and it is in the abnormal load state, the controller 140 determines whether the temperature of the bus bar 210 is greater than the predetermined second threshold value T2 and it is in the abnormal load state (S104). In the instant case, the second threshold may be set by adding a correction value to a maximum allowable temperature of the high-voltage connector body (housing).

When the temperature of the bus bar 210 is greater than the predetermined second threshold value T2 and it is in the abnormal load state, the controller 140 outputs a fire warning notification through the interface device 130 (S105).

The fire warning notification indicates a state that warns that a temperature of a bus bar of a monitored load is in a possible fire situation, and outputs a notification that prompts a driver to take immediate action, accompanied by a flashing red warning light on an instrument panel and accompanied by a beep. When a fire warning notification flag is displayed, the controller 140 interworks with an in-vehicle infotainment system (Blue Link) to immediately transfer a fire warning notification to the service center, and the service center establishes an emergency communication network that immediately contacts with a fire department near the vehicle after checking the situation immediately (wired contact to the user). In the instant case, a driving mode of the vehicle is switched to an emergency mode to cut off a normal load operation, and after a cause is identified and measures are taken, it is converted to a driving condition.

On the other hand, when the temperature of the bus bar 210 is below the predetermined second threshold value T2 or it is not in the abnormal load state, the controller 140 counts an overtemperature state (S106), and determines whether a counting number is smaller than the predetermined overtemperature state repetition number threshold N1 (S107). The controller 140 may set the predetermined overtemperature state repetition number threshold by use of a value evaluated in an actual vehicle driving condition.

The interface device 130 outputs a vehicle inspection notification (S108) when the counting number is smaller than the predetermined overtemperature state repetition number threshold N1, and outputs an overtemperature state notification (S109) when the counting number is equal to or greater than the predetermined overtemperature state repetition number threshold N1.

The overtemperature state notification indicates a state that occurs when the temperature of the bus bar of the monitored load exceeds a reference value, and it may be checked whether a current state is an overtemperature state and how many overtemperature states have been observed through a yellow warning light displayed on the instrument panel and the number next to it.

When an overtemperature state occurs, through vehicle inspection notification, an overtemperature state entering situation is counted as a method for determining whether a corresponding situation is temporary or continuous. A time period from the moment it exceeds the first reference value T1 to the moment it falls again is measured as a counting condition, and a sequence thereof is measured as one time. A general counting number under an actual vehicle driving condition is measured, an evaluation value thereof is set as a reference value, and it is determined based on the accumulated number of times.

When the vehicle inspection is notified, the controller may perform a reservation for a nearby maintenance center in conjunction with an in-vehicle infotainment system.

Accordingly, according to an exemplary embodiment of the present disclosure, a possibility of a vehicle fire may be detected in advance to be warned by measuring a temperature by a temperature sensor provided on a bus bar of a high-voltage junction box in an event of overtemperature due to abnormal states such as overvoltage, overcurrent, and short-circuit in the high-voltage junction box of an eco-friendly vehicle.

Figure 6:
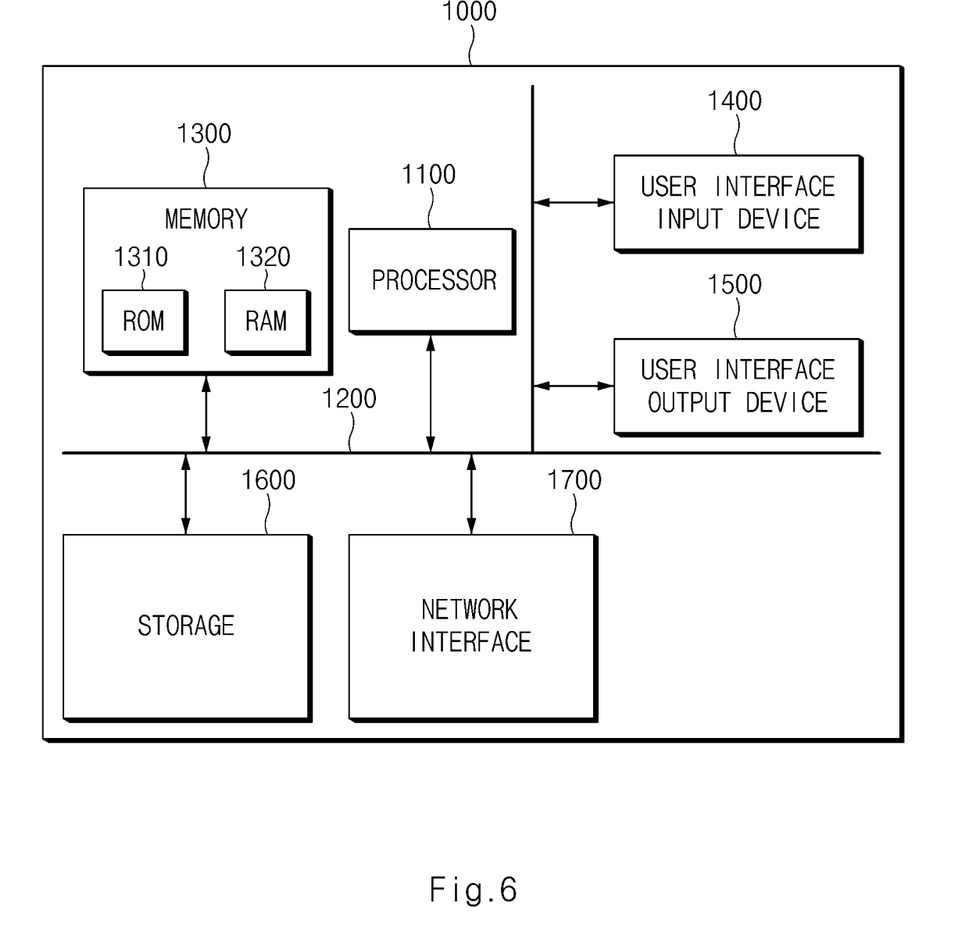
FIG. 6 illustrates a computing system according to various exemplary embodiments of the present disclosure.

FIG. 6 illustrates a computing system according to various exemplary embodiments of the present disclosure.

Referring to FIG. 6, the computing system 1000 includes at least one control 1100 connected through a bus 1200, a memory 1300, a user interface input device 1400, a user interface output device 1500, and a storage 1600, and a network interface 1700.

The controller 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the controller 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to controller 1100, which can read information from and write information to the storage medium. Alternatively, the storage medium may be integrated with the controller 1100. The controller and the storage medium may reside within an application specific integrated circuit (ASIC). The ASIC may reside within a user terminal. Alternatively, the controller and the storage medium may reside as separate components within the user terminal.

The above description is merely illustrative of the technical idea of the present disclosure, and those skilled in the art to which an exemplary embodiment of the present disclosure pertains may make various modifications and variations without departing from the essential characteristics of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fire alerting apparatus for a vehicle, the fire alerting apparatus comprising:
   a temperature sensing device configured to detect a temperature of a bus bar of a junction box; and
   a controller configured to perform a warning by determining at least one of a fire warning state, an overtemperature state, or a vehicle inspection state in accordance with a result of detecting the temperature of the bus bar,
   wherein the controller determines whether the junction box is in a normal state, in a fire risk situation, or in the overtemperature state based on a level of the temperature of the bus bar,
   wherein the controller is configured to determine whether the temperature of the bus bar is greater than a first reference value,
   wherein when the temperature of the bus bar is greater than the first reference value, the controller is configured to determine whether the temperature of the bus bar is greater than a second reference value which is greater than the first reference value, and
   wherein when the temperature of the bus bar is greater than the second reference value and a vehicle state is in an abnormal load state in which overcurrent or overvoltage occurs, the controller is configured to conclude that the vehicle is in the fire risk situation and to output the warning including a fire warning notification through an interface device.

2. The fire alerting apparatus of claim 1, further including:
   the interface device controlled by the controller to notify the at least one of the fire warning state, the overtemperature state, or the vehicle inspection state.

3. The fire alerting apparatus of claim 2, wherein the controller is configured to:
conclude that driving of the vehicle is in the normal state when the temperature of the bus bar is equal to or smaller than the first reference value.

4. The fire alerting apparatus of claim 1, wherein when the temperature of the bus bar is greater than the second reference value, the controller is configured to conclude that the vehicle is in the fire risk situation and to output the warning including a fire warning notification through the interface device.

5. The fire alerting apparatus of claim 1, wherein when the temperature of the bus bar is smaller than the second reference value and greater than the first reference value, the controller is configured to start counting the overtemperature state.

6. The fire alerting apparatus of claim 5, wherein when an overtemperature state counting value is greater than or equal to a predetermined threshold value, the controller is configured to conclude that the vehicle state is the overtemperature state, and to output the warning including an overtemperature state notification through the interface device.

7. The fire alerting apparatus of claim 5, wherein when an overtemperature state counting value is smaller than a predetermined threshold value, the controller is configured to conclude that vehicle inspection is required, and to output a vehicle inspection notification through the interface device.

8. The fire alerting apparatus of claim 2, wherein the interface device is configured to differentiate a color of a warning light when the fire warning state is notified and the overtemperature state is notified, and to display an overtemperature state repetition number together.

9. The fire alerting apparatus of claim 2, further including:
a communication device which is controlled by the controller to transmit the fire warning state of the vehicle to an external vehicle service center, when the fire warning state is notified.

10. The fire alerting apparatus of claim 2, wherein the controller is configured to switch a driving mode of the vehicle to an emergency mode when the fire warning state is notified, and to block a load operation in the vehicle.

11. The fire alerting apparatus of claim 1, wherein the temperature sensing device is provided in a load having a peak current or voltage greater than a predetermined value among connectors configured in the junction box.

12. The fire alerting apparatus of claim 1, wherein the temperature sensing device is provided in a part having a temperature greater than a predetermined value in accordance with an internal temperature distribution of the bus bar of the junction box.

13. The fire alerting apparatus of claim 1, wherein the temperature sensing device is provided in a load having a maximum allowable temperature lower than a predetermined value or a high voltage connector body of the junction box.

14. A fire alerting method for a vehicle, the fire alerting method comprising:
detecting a temperature of a bus bar of a junction box; and
performing, by a controller, a warning by determining at least one of a fire warning state, an overtemperature state, or a vehicle inspection state in accordance with a temperature detecting result of a temperature sensing device,
wherein the performing of the warning includes determining whether the junction box is in a normal state, in a fire risk situation, or in the overtemperature state based on a level of the temperature of the bus bar,
wherein the performing of the warning includes:
determining, by the controller, whether the temperature of the bus bar is greater than a first reference value,
when the temperature of the bus bar is greater than the first reference value, determining, by the controller, whether the temperature of the bus bar is greater than a second reference value which is greater than the first reference value, and
when the temperature of the bus bar is greater than the second reference value and a vehicle state is in an abnormal load state in which overcurrent or overvoltage occurs, concluding, by the controller, that the vehicle is in the fire risk situation and outputting the warning including a fire warning notification through an interface device.

15. The fire alerting method of claim 14, wherein the performing of the warning further includes:
concluding, by the controller, that driving of the vehicle is in the normal state when the temperature of the bus bar is equal to or smaller than the first reference value.

16. The fire alerting method of claim 15, wherein the performing of the warning further includes:
concluding, by the controller, that the vehicle is in the fire risk situation to output the warning including a fire warning notification when the temperature of the bus bar is greater than the second reference value.

17. The fire alerting method of claim 16, wherein the performing of the warning includes:
starting, by the controller, counting the overtemperature state when the temperature of the bus bar is equal to or smaller than the second reference value and greater than the first reference value.

18. The fire alerting method of claim 17, further including:
when an overtemperature state counting value is greater than or equal to a predetermined threshold value, concluding, by the controller, that the vehicle state is the overtemperature state, and outputting, by the controller, the warning including an overtemperature state notification; and
concluding, by the controller, that vehicle inspection is required, and outputting, by the controller, the warning including a vehicle inspection notification when the overtemperature state counting value is smaller than the predetermined threshold value.

* * * * *